Sept. 16, 1941.   E. S. L. BEALE ET AL   2,256,307
APPARATUS FOR OBTAINING INDICATIONS OF THE PRESSURE AND/OR VARIATION
OF PRESSURE IN THE CYLINDERS OF INTERNAL COMBUSTION ENGINES
Filed July 1, 1938
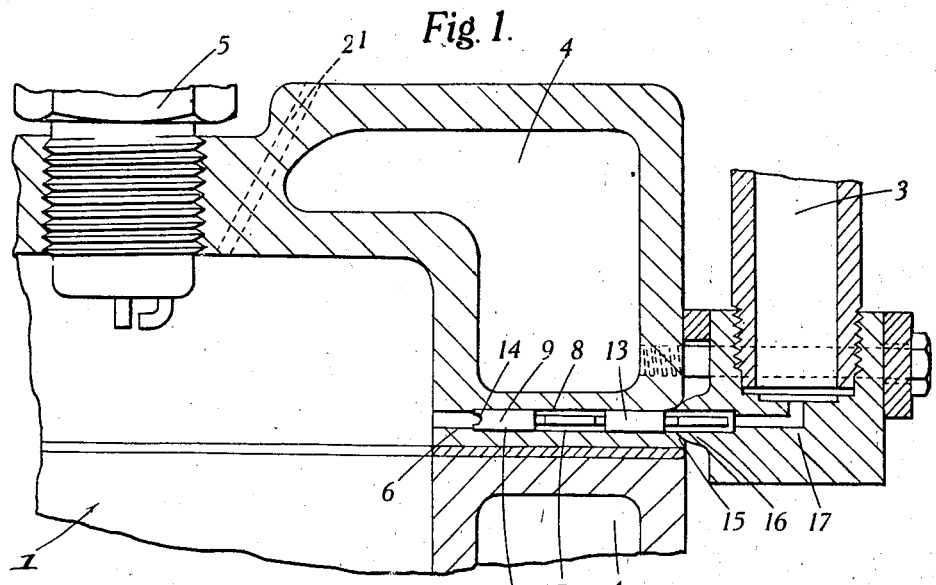
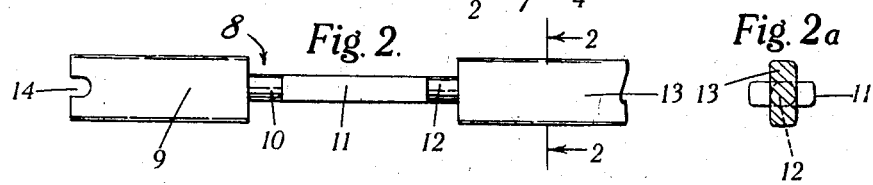
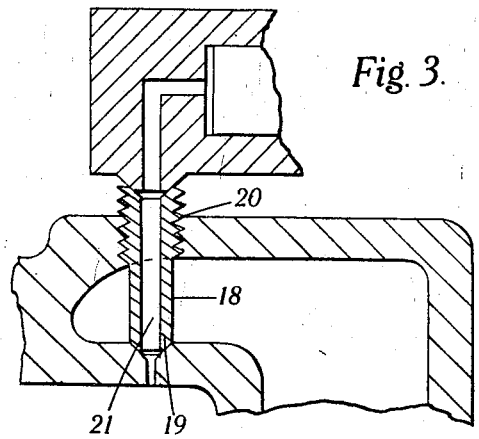
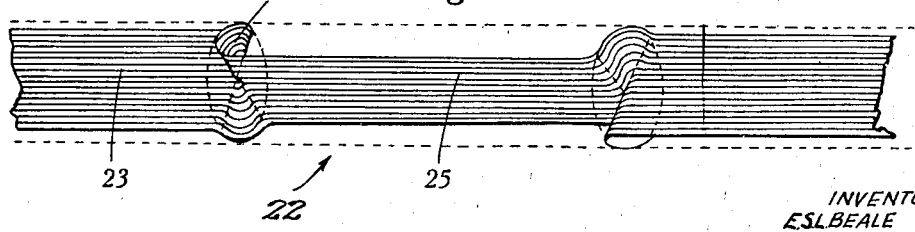
INVENTORS
E.S.L.BEALE
R.STANSFIELD
BY
ATTORNEY Patented Sept. 16, 1941

2,256,307

UNITED STATES PATENT OFFICE 2,256,307

APPARATUS FOR OBTAINING INDICATIONS OF THE PRESSURE AND/OR VARIATION OF PRESSURE IN THE CYLINDERS OF INTERNAL COMBUSTION ENGINES

Evelyn Stewart Lansdowne Beale, Chelsea, London, and Richard Stansfield, Teddington, England, assignors to International Standard Electric Corporation, New York, N. Y.

Application July 1, 1938, Serial No. 216,920
In Great Britain October 15, 1937

6 Claims. (Cl. 73—31)

This invention relates to pressure indicators for internal combustion and compression ignition engines hereinafter referred to generically as internal combustion engines and more particularly to such engines which are not provided with an indicator hole.

Generally speaking, there is rarely the space to fit an indicator or pick-up unit to the majority of commercial designs of petrol engine without recourse to an indicator passage, it being often impossible to find room for a hole in the cylinder wall having a thread size even as small as 14 mm. diameter. On the other hand aero-engines having two sparking plug holes may be indicated from one of the plug holes but the engine is not then firing under normal conditions, and discrepancies may be introduced. A special hole may be provided in experimental engines in some cases provided the additional boss does not introduce undue cooling difficulties, but it is clear that a unit which gives accurate indications or only introduces a known and negligible error with a short and small bore passage would have great advantages.

The above considerations and a desire to make use of the valuable effect of a small indicator passage in cooling the diaphragm of the indicator or pick-up unit have in the past led to a number of experiments being carried out with a view to devising a satisfactory arrangement, but without much success. One difficulty which was always encountered was that as the length of the passage increased waves of a frequency determined by the passage length began to show on the pressure diagram, i. e. the passage began to operate in a manner similar to an organ pipe with a closed end. A pressure wave reaching the open end of such a pipe would cause the gas in the pipe to oscillate at its natural frequency, the wave length being four times the passage length plus any small "end effect." Therefore as the frequency of the long passage was much lower than the detonation frequency, it was proposed to employ an electrical filter in the amplifier circuit of the indicator arranged to reject any input in the frequency range associated with the passage effect.

In accordance with the present invention there is provided a method of arranging apparatus for obtaining a cylinder pressure diagram from an internal combustion engine consisting in drilling through the cylinder wall a hole of small diameter (e. g. not greater than about ⅛ inch) to form a passage through which the compressed gases may pass to the indicator unit, with which the end of the passage is in communication, and damping out resonance effects caused by the said passage by causing the gases to undergo a plurality of changes of direction of movement during travel through the passage. The changes of direction of the gases may be caused by inserting into the hole a rod shaped to permit the gases to pass through the passage but at the same time changing their direction.

In order that the invention may be clearly understood reference is directed to the accompanying drawing which shows diagrammatically and by way of example embodiments of the invention.

In the drawing, Fig. 1 is a cross-sectional view of a combustion engine showing the pressure indicating arrangement according to the invention.

Fig. 2 is an enlarged view of part of Fig. 1.

Fig. 2a is a cross-sectional view of Fig. 2 taken along the line 2—2 thereof.

Fig. 3 is a vertical sectional view of a modification of Fig. 1.

Fig. 4 is an enlarged view of a modification of Fig. 2.

Referring to the drawing, and more particularly to Fig. 1 an engine cylinder indicated generally by the reference numeral 1, is provided with a small bore hole 2 through which gases may pass to an indicator or pick-up unit 3. The hole 2 is preferably drilled through a portion of the cylinder wall which is not provided with a cooling jacket 4, and an alternative position for the hole 2 is indicated in dot and dash lines at 2' adjacent to the sparking plug 5. The hole 2 comprises a narrow portion 6 extending for a short length of the hole at the inner end thereof, this portion of the hole having a diameter of about 1/16 inch and an enlarged portion 7 of about 3/32 inch diameter for the other portion of the hole, though if desired the diameter of the larger part of the hole might be increased to as much as ⅛ inch. Into the enlarged portion 7 there is inserted a rod 8 (see also Fig. 2 which shows a rod enlarged) shaped to permit the gases to pass along the hole 2 in such a way that their direction of movement is substantially changed several times in order to damp out resonant oscillations.

Referring to Figs. 2 and 2a which show details of the rod 8 drawn to a scale about three times full size it will be observed that the rod 8, may be provided with a series of oppositely disposed flat portions 9, 11, 13 etc., joined by short turned sections 10, 12 etc. In one example in the figure, at the inner end of the rod the flat portion 9 extends for about ⅜ inch and then a groove 10 is turned in the rod down to a diameter equal to the thickness of the flat portion. This is followed by another flat portion 11 disposed at right angles to 9. This again is followed by a groove 12 which is in turn followed by a flat portion 13 disposed at right angles to 11. This sequence is repeated as often as is necessary to cover the whole length of the hole 2.

The purpose of the groove between the flat portions is to provide a means of communication between the successive spaces formed by the flat portions fitting in the circular hole. The cross-sectional area of the path available for gas flow in the hole with rod in position is of the order of half the free area of the hole and it will be observed that the gas travelling down the passage from the end along each side of the flat portion 9 is caused to change substantially in direction at the groove 10 in order to flow along the top and bottom of the flat portion 11: the same thing occurs at each successive groove. Another change of direction occurs at the entrance into the larger bore hole 7 from the smaller bore hole 6. The necessary cross-sectional area at this point being obtained by means of a semi-circular slot 14, cut in the end of the flat portion 9. A similar slot is provided in the flat portion which terminates the rod at the other end for the same purpose.

Changes in direction should not be so frequent as to cause too much resistance to the flow of gas along the passage, or to cause a substantial increase in the effective length of the hole. Obviously other means may be employed to impart the required changes of direction to the gases. For instance, in certain cases the necessary damping may be provided by an arrangement of the hole in such a way that there is a series of slight constrictions along its length. The constriction may cause only a small change in the direction of the gases but it may produce a substantial degree of resistance to the flow, due to the acceleration of the gases in passing through the smaller area at the constrictions.

The outer end of the hole 2 is bevelled at 15 in order to facilitate connection of the indicator unit 3 to the cylinder wall in such a way that a gas tight joint is provided. The unit 3 is provided with a ball shaped member 16 which fits into the bevelled portion 15 the said ball shaped member 16 being provided with a centrally disposed hole 17 to register with the hole 2 in the cylinder wall; if desired the rod 8 may be provided with an extension to project outside the cylinder wall and into the hole 17 which may be enlarged for part of its length to accommodate the rod.

The aforesaid hole 17 is shaped to impart a further substantial change of direction to the gases before reaching the diaphragm disposed within the indicator unit. The indicator unit may be bolted to the outer wall of the cooling jacket 4 as shown, or may be otherwise retained in position adjacent to the cylinder. The use of a small hole permits the present invention to be employed in connection with almost any sort of engine because an enormous number of engines have no room to drill a hole larger than 3/32 inch, but practically all permit the drilling of a hole up to that size. Further employment of a hole of the specified diameter takes full advantage of the cooling effect of a small bore hole. Another feature of the present invention is that resonant oscillations are damped out by the substantial changes of direction imparted to the gases with the result that no filter circuit to reject the resonant frequencies is necessary.

Fig. 3 shows a modified embodiment of the invention in which a screwed adaptor 18 is inserted into a hole drilled in the cylinder wall at 19 and through the outer wall of the water jacket at 20. The adaptor is provided with a central bore 21 of the desired diameter to accommodate means for preventing resonance effects. The inner end of the adaptor is provided with a convex bevelled portion to fit into a recess in the cylinder wall to provide a water tight joint and in this way the bore 21 of the adaptor 18 may provide the wider portion of the hole and the hole in the cylinder wall may provide the narrower portion thereof.

In Fig. 4 there is shown a modified means of imparting the changes of direciton to the gases. Instead of the rod a shaped strip of metal 22 is inserted into the hole, the said strip of metal being inclined in one direction at the portion 23 and then being bent at 24 in such a manner as to be inclined in the other direction at 25 and so on. In this manner a rather greater amount of the hole is left open for the passage of the gases.

It will of course be appreciated that the volume of the air chamber immediately beneath the diaphragm of the indicator unit must be kept very small, for example 7/16 inch diameter and .010 inch thick, that is about 1 or 2 thousandths of a cubic inch so that the amount of gas which has to flow through the passage with cyclic changes of cylinder pressure is kept to the minimum.

What is claimed is:

1. Apparatus for obtaining a pressure diagram from a chamber subject to rapid changes in pressure, such as an internal combustion engine cylinder there being an elongated passage through the wall of said chamber, said passage having at its inner end a bore of approximately 1/16 inch diameter in communication with said chamber and an enlarged portion of about 3/32 inch diameter for the greater part of the passage and being of a length many times the diameter of said bore whereby resonant vibrations tend to occur in said passage, and a rod inserted in said passage defining with the walls of the passage a broken line path for the gases whereby resonance effects of the gas column in said passage are effectively damped out, and an indicator unit responsive to pressure communicated through said passage mounted at the outer end of the passage.

2. Apparatus according to claim 1, in which said rod located in the passage is in the form of a metal strip having successive portions of its length inclined in different directions.

3. Apparatus according to claim 1, in which the indicator unit is also provided with a passage-way in communication with the outer end of the passage in the cylinder wall, the passage-way in the indicator unit having off-set portions to impart a further substantial change of direction in the gases passing therethrough.

4. Apparatus according to claim 1, in which the indicator unit is provided with a ball-shaped member fitting into a corresponding recess at the outer end of the passage-way in the cylinder wall to provide a pressure-tight joint.

5. Apparatus according to claim 1, in which the rod located in said passage-way has off-set portions for changing the direction of movement of the gases approximately at intervals of ⅜ of an inch.

6. Apparatus according to claim 1, in which the passage-way through the cylinder wall is defined by an adaptor having a central bore in communication with the passage through the cylinder wall, said adaptor also extending through a water jacket for the cylinder.

EVELYN STEWART LANSDOWNE BEALE.
RICHARD STANSFIELD.